(12) United States Patent
Smeeton et al.

(10) Patent No.: US 12,078,800 B2
(45) Date of Patent: Sep. 3, 2024

(54) PUPIL EXPANDER INTEGRITY

(71) Applicant: Envisics Ltd, Milton Keynes (GB)

(72) Inventors: Timothy Smeeton, Milton Keynes (GB); Jamieson Christmas, Milton Keynes (GB); Daniel Burnham, Milton Keynes (GB); Ruisheng Lin, Milton Keynes (GB); Rakesh Maharjan, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 18/552,629

(22) PCT Filed: Aug. 17, 2022

(86) PCT No.: PCT/EP2022/072926
§ 371 (c)(1),
(2) Date: Sep. 26, 2023

(87) PCT Pub. No.: WO2023/046375
PCT Pub. Date: Mar. 30, 2023

(65) Prior Publication Data
US 2024/0168283 A1    May 23, 2024

(30) Foreign Application Priority Data
Sep. 21, 2021    (GB) ...................... 2113438

(51) Int. Cl.
*G02B 27/01* (2006.01)
*G02B 27/00* (2006.01)

(52) U.S. Cl.
CPC ..... *G02B 27/0081* (2013.01); *G02B 27/0093* (2013.01); *G02B 27/0149* (2013.01);
(Continued)

(58) Field of Classification Search
CPC ............ G02B 27/0081; G02B 27/0093; G02B 27/0149; G02B 2027/0125; G02B 2027/0105
(Continued)

(56) References Cited

U.S. PATENT DOCUMENTS

2016/0238840 A1    8/2016    Charle
2016/0282622 A1    9/2016    Hiraide
(Continued)

FOREIGN PATENT DOCUMENTS

| CN | 211905863 U | 11/2020 |
| CN | 113325580 A | 8/2021 |

(Continued)

OTHER PUBLICATIONS

Examination Report Under Section 18(3) in United Kingdom, Patent Application No. 2113438.2, dated Mar. 28, 2024.
(Continued)

*Primary Examiner* — Joseph P Martinez
*Assistant Examiner* — Grant A Gagnon
(74) *Attorney, Agent, or Firm* — McDonnell Boehnen Hulbert & Berghoff LLP

(57) ABSTRACT

A holographic system comprises a display device and a waveguide pupil expander. The display device is arranged to display a hologram and to output spatially modulated light in accordance with the hologram. The waveguide pupil expander is configured to receive spatially modulated light from the display device at the input port thereof and to expand the viewing window of the system. The waveguide pupil expander comprises first and second substantially planar reflective surfaces arranged in parallel having an optically transparent material therebetween. The first reflective surface is fully reflective and the second reflective surface is partially reflective such that light is guided from
(Continued)

the input port to an output port at the second reflective surface by a series of internal reflections. The optically transparent material is formed by a layered glass structure arranged to maintain the integrity of the waveguide in the event of breakage of glass.

19 Claims, 12 Drawing Sheets

(52) U.S. Cl.
CPC .............. *G02B 2027/0105* (2013.01); *G02B 2027/0125* (2013.01)

(58) Field of Classification Search
USPC ........................................................ 359/630
See application file for complete search history.

(56) References Cited

U.S. PATENT DOCUMENTS

| | | |
|---|---|---|
| 2020/0018963 A1 | 1/2020 | Osterhout |
| 2020/0064633 A1 | 2/2020 | Maimone |
| 2020/0247017 A1 | 8/2020 | Waldern et al. |
| 2021/0055549 A1 | 2/2021 | Chang |
| 2021/0239984 A1 | 8/2021 | Popovich et al. |
| 2023/0027493 A1 | 1/2023 | Shams |

FOREIGN PATENT DOCUMENTS

| | | |
|---|---|---|
| DE | 202019101599 U | 2/2011 |
| DE | 102018213061 A1 | 1/2020 |
| GB | 2472444 A | 2/2011 |
| JP | 3222983 U | 9/2019 |
| WO | 94/15239 A1 | 7/1994 |
| WO | 2016/103263 A1 | 6/2016 |
| WO | 2019226269 A1 | 11/2019 |
| WO | 2021/021926 A1 | 2/2021 |
| WO | 2021110746 A1 | 6/2021 |
| WO | 2021138607 A1 | 7/2021 |

OTHER PUBLICATIONS

Combined Search and Examination Report in United Kingdom, Patent Application No. 2113438.2, dated Feb. 23, 2022.
Rolf R. Hainich, et al., Displays: Fundamentals and Applications, Near-Eye Displays, Ch. 10, CRC Press, 2016.
Tempered Glass, Wikipedia, Sep. 19, 2021.
Safety Glass, Wikipedia, Jul. 13, 2021.
International Search Report, International Searching Authority, International Application No. PCT/EP2022/072926, dated Jan. 30, 2023.
"Introduction of WGF™ Wire grid polarizer film", Asahi Kasei Corporation Electronic & Functional Products Division WGF Project, Apr. 1, 2017, XP093149441, Retrieved from the Internet: URL:https://automotive.asahi-kasei.eu/wp-content/uploads/2021/03/Asahi-Kasei-WGF-introduction.pdf [retrieved on Apr. 9, 2024].
Wikipedia, "Tempered Glass", Available fromo link https://web.archive.org/web/20210817203448/https://en.wikipedia.org/wiki/Tempered_glass, article dated Aug. 17, 2021, 6 pages.

PUPIL EXPANDER INTEGRITY

CROSS-REFERENCE TO RELATED APPLICATIONS

The present application is a U.S. National Stage application of International Patent Application No. PCT/EP2022/072926, filed Aug. 17, 2022, which claims the benefit of priority to United Kingdom Patent Application No. 2113438.2 filed Sep. 21, 2021.

FIELD

The present disclosure relates to a pupil expander such as a planar waveguide pupil expander. The present disclosure also relates to a projector and a method of projection such as a holographic projection and a method of holographic projection. Some embodiments relate to a head-up display. Some embodiments relate to a waveguide pupil expander that maintains functional and/or structural integrity in the event of breakage thereof.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic display device, such as a holographic projector, may be provided using the system described herein. Such projectors have found application in head-up displays, "HUD".

SUMMARY

Aspects of the present disclosure are defined in the appended independent claims.

There is disclosed herein a system comprising a display device and a waveguide pupil expander. The display device is arranged to output spatially-modulated light to form an image. The waveguide pupil expander comprises a pair of parallel planar reflective surfaces. The waveguide pupil expander defines an input port and an output port or viewing surface. The input port is arranged to receive spatially-modulated light from the display device. The output port is arranged to output the spatially-modulated light to a viewing window of the system. The viewing window is typically an area or volume within which a viewer may view or perceive the image. The pair of parallel reflective surfaces is arranged to guide the spatially-modulated light from the input port to the output port by a series of internal reflections. A first reflective surface of the pair of parallel reflective surfaces is partially transmissive and partially reflective, and a second reflective surface of the pair of parallel reflective surfaces is substantially fully reflective (i.e., a near perfect mirror).

The waveguide pupil expander of the system comprises a glass structure, which may be subject to mechanical, structural and/or optical failure due to breakage of glass. In accordance with a first aspect of the present disclosure, the waveguide pupil expander comprises a layered glass structure arranged so as to maintain the integrity of the waveguide pupil expander in the event of breakage of glass or the like. In particular, the layered glass structure comprises at least one layer of glass material and at least one layer of another material having properties of maintaining the integrity of the waveguide pupil expander. In the following description, the term "glass" refers to any form of optically transparent (solid) material that is fragile (i.e. breakable upon impact) including silica-based glass or crystalline optically transparent material.

In the present disclosure, references to the "integrity" of the waveguide pupil expander may refer to the structural integrity thereof. The structural integrity of the waveguide pupil expander may be considered to be retained when the (external) reflective surfaces are kept parallel in the event of breakage of glass therein. In addition, the integrity of the waveguide pupil expander may refer to the functional integrity thereof. The functional integrity of the waveguide pupil expander may be considered to be retained when at least part of the light received at the input port thereof is guided to the viewing area in the event of breakage of glass therein.

In embodiments, the layered glass structure of the waveguide pupil expander comprises a glass layer and an optically transparent non-glass layer. In some examples, the layered glass structure comprises a glass layer laminated with or to a polymer-based layer. The polymer-based layer may comprise a polymer-based louvre, a polymer-based polariser, a polymer-based turning film or the like. In other examples, the layered glass structure comprises a glass layer and a resin layer. In these examples, the layered glass structure may form an optically transparent material between the first and second reflective surfaces. The layered glass structure may have low-birefringence and/or the resin may comprise a resin material that is refractive index-matched to the glass. The layered glass structure may comprise a resin interlayer between internal major surfaces of first and second glass layers. The layered glass structure may have a fully reflective coating on the external major surface of the first glass layer and a partially reflective coating on the external major surface of the second glass layer. The resin material may be arranged to maintain parallelism between the external major surfaces of the first and second glass layers. For example, the resin material may comprise polyvinyl butyral.

In other embodiments, the layered glass structure comprises two or more layers of tempered glass. In these examples, the layered glass structure may form an optically transparent material between the first and second reflective surfaces. In some examples, the layered glass structure comprises a first layer of glass under compressive strain and a second layer of glass under tensile strain and, optionally, a third layer of glass under compressive or tensile strain.

In accordance with a second aspect of the present disclosure, the system comprises a display device and a waveguide pupil expander in accordance with the first aspect. In embodiments, the system comprises a laser light source.

The display device and waveguide pupil expander may be referred to as a projection system or image projection system. In some embodiments, the projection system is a holographic system. The system includes a display device comprising a spatial light modulator arranged to display a diffractive pattern (e.g., hologram) of/corresponding to an image and to output spatially modulated light in accordance with the diffractive pattern. The system further includes a waveguide pupil expander configured to receive spatially modulated light from the display device at an input port thereof and to expand the viewing window of the projection system.

In some embodiments of the first and second aspects, the display device further comprises a controller configured to control the spatially modulated light output by the display device.

In examples, the controller is configured to control (e.g., turn off) a light source of the display device in response to a signal indicating detection of the breakage of glass.

In embodiments of the first and second aspects, the system further comprises a viewer-tracking system (or eye-tracking system) in communication with a controller (e.g. system controller or holographic controller). The viewer-tracking system may be arranged to determine a viewing position (e.g., eye position) within the viewing window. The viewer tracking-system is further arranged to monitor a viewer's face to detect stray light incident thereon, and may be arranged to provide a signal to the controller upon detection thereof. In examples, the viewer-tracking system comprises a light detector directed at the viewer's face to detect stray visible light, such as visible laser light, on the viewer's face. In examples, the viewer-tracking system comprises an infrared light source configured to periodically illuminate the viewer's face. The light detector may be configured to detect stray infrared light. The light detector may be configured to detect light of infrared and visible wavelengths.

The signal indicating detection of the breakage of glass may be generated in response to the detection of stray laser light of the system by an eye-tracking system, optionally, an eye-tracking system configured to use infra-red light for eye-tracking. In embodiments, the light detector of the eye-tracking system is additionally configured to respond to visible light, optionally, between pulses or gates of infra-red light emission for eye-tracking purposes. In some embodiments, a wavelength conversion element—e.g. quantum dot—is incorporated to allow an infra-red camera of the eye-tracking system to detect non infra-red light—e.g. visible laser light of the projection system. In other embodiments, a broadband (i.e. infra-red and visible) camera is dual-purposed for eye-tracking system and stray laser light detection—e.g. in a gated/time sequential scheme, as described above.

In embodiments of the first and second aspects, the waveguide pupil expander is further configured so that the first fully reflective surface thereof can be mounted to, or is integrated with, a relatively large and stable component arranged to absorb any impact so as to reduce the risk of shattering of the glass. In examples, the component comprises metal so as to improve thermal stability.

In embodiments of the first and second aspects, the system further comprises a light detecting system for monitoring for scattered light. In examples, the light detecting system is configured to detect scattered light from one or more of: the waveguide pupil expander, optical components of the system, and external reflective components, such as a windscreen or mirror, surrounding the system.

In embodiments of the first and second aspects, the system further comprises a container of expandable foam arranged to release the foam to surround one or more optical components of the system in response to detection of an event, such as an impact, breakage or other type of failure event. In some examples, the expander foam comprises a light absorbing filler material.

In embodiments of the first and second aspects, fragile optical components of the system, such as the pupil expander waveguide, are immersed in a (transparent) fluid; a high refractive index (transparent) liquid is provided between the waveguide and a cover glass, and/or an optically clear adhesive at least partially surrounds the waveguide pupil expander.

The term "hologram" is used to refer to the recording which contains amplitude information or phase information, or some combination thereof, regarding the object. The recording of a hologram may be stored in a data storage device (i.e., memory) or embodied in light (e.g., as a light signal) forming a carrier wave for the amplitude and/or phase information. That is, the light may be described as being "encoded with a hologram" or "modulated in accordance with a hologram", so as to propagate the hologram, rather than an image.

The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "writing" and "addressing" may be used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
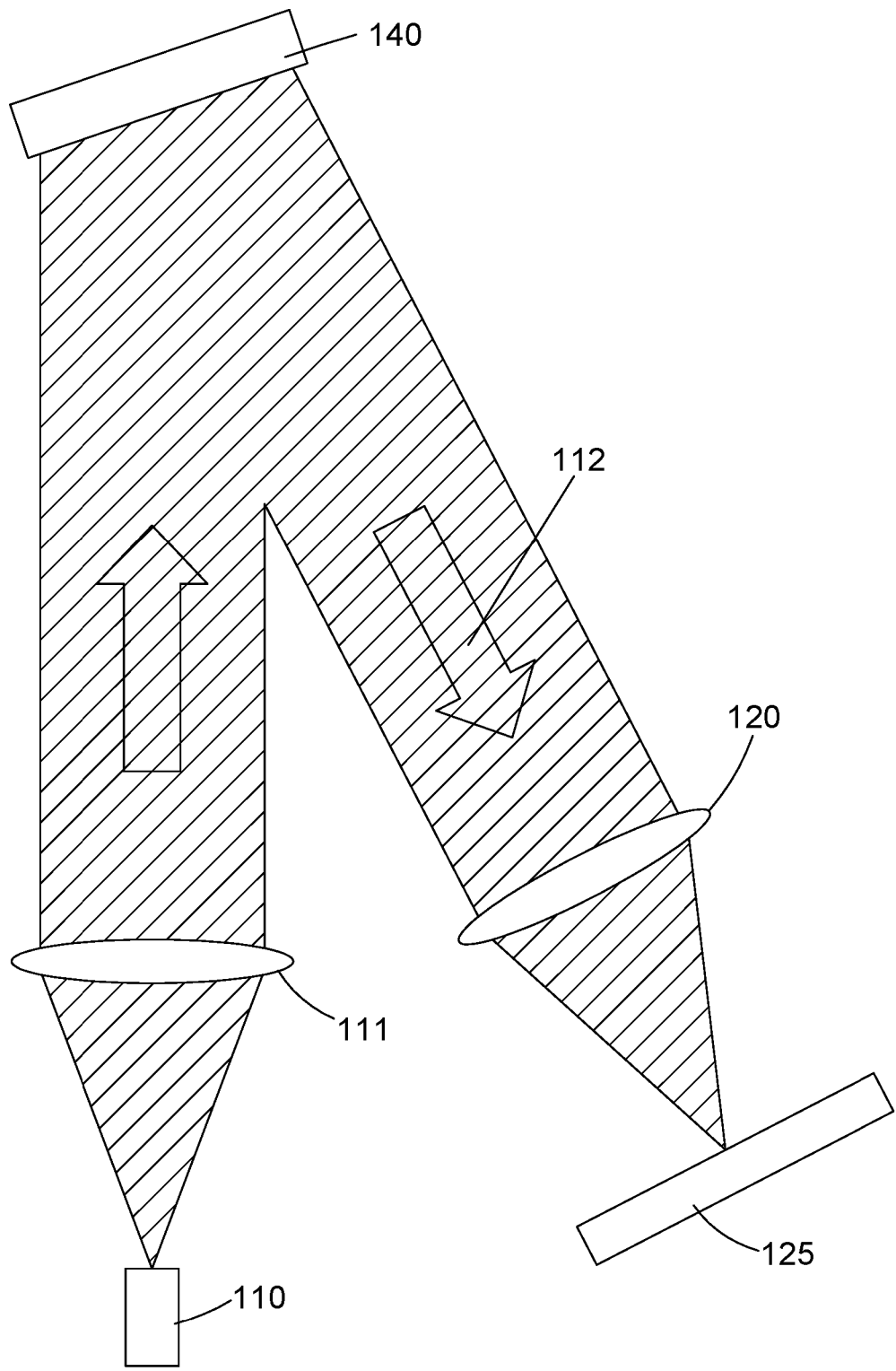
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

The embodiment of FIG. 1 may be used as part of holographic system in which the holographic reconstruction or replay image is relayed to a viewing area. As the skilled person will appreciate, in other embodiments the holographic system may be used in a holographic system in which the exit wavefront 112 is relayed to the viewing area without forming an intermediate holographic reconstruction. It is sometimes said that, in these embodiments, the lens of the eye performs a hologram-to-image conversion or transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
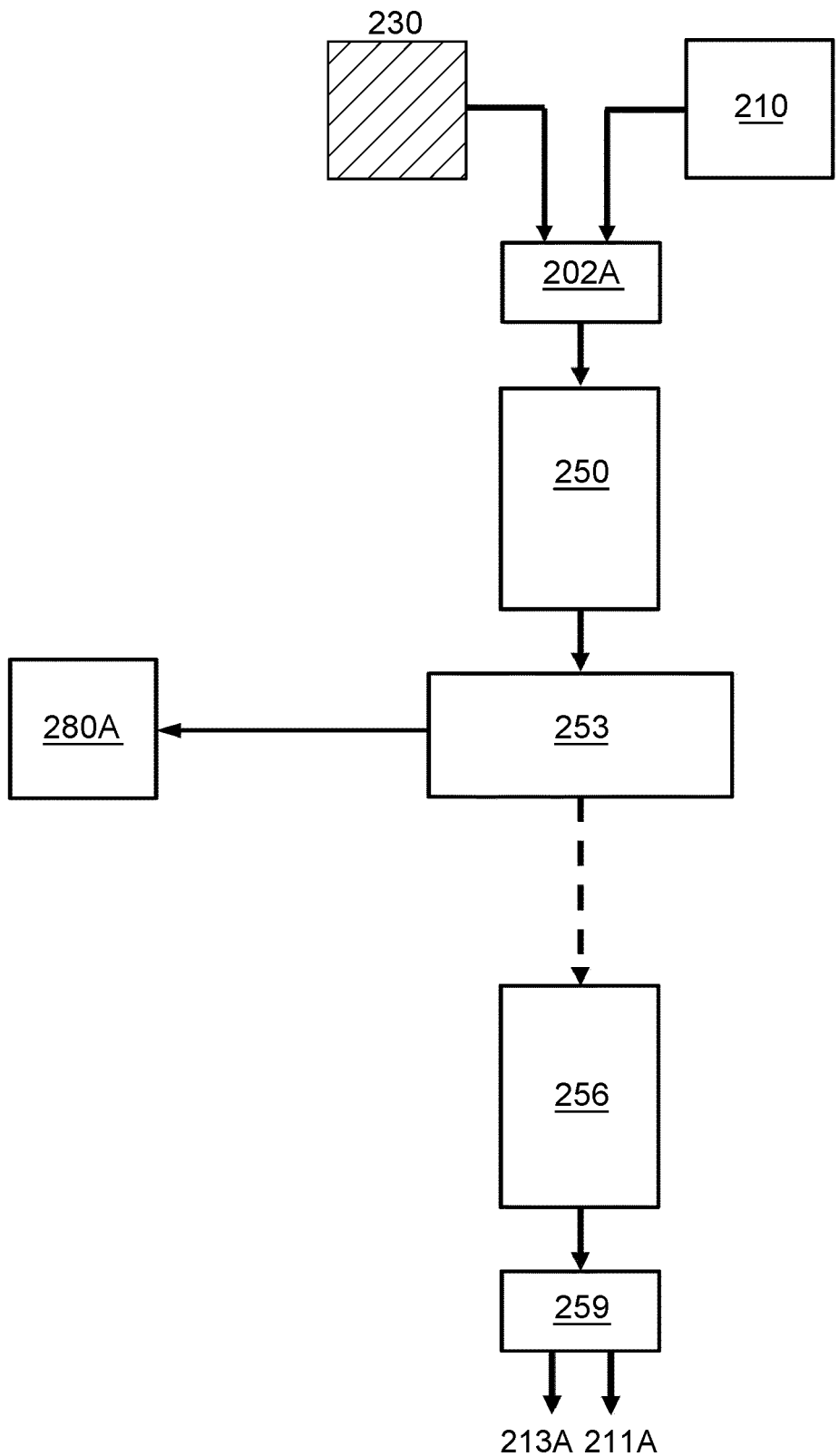
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 210 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
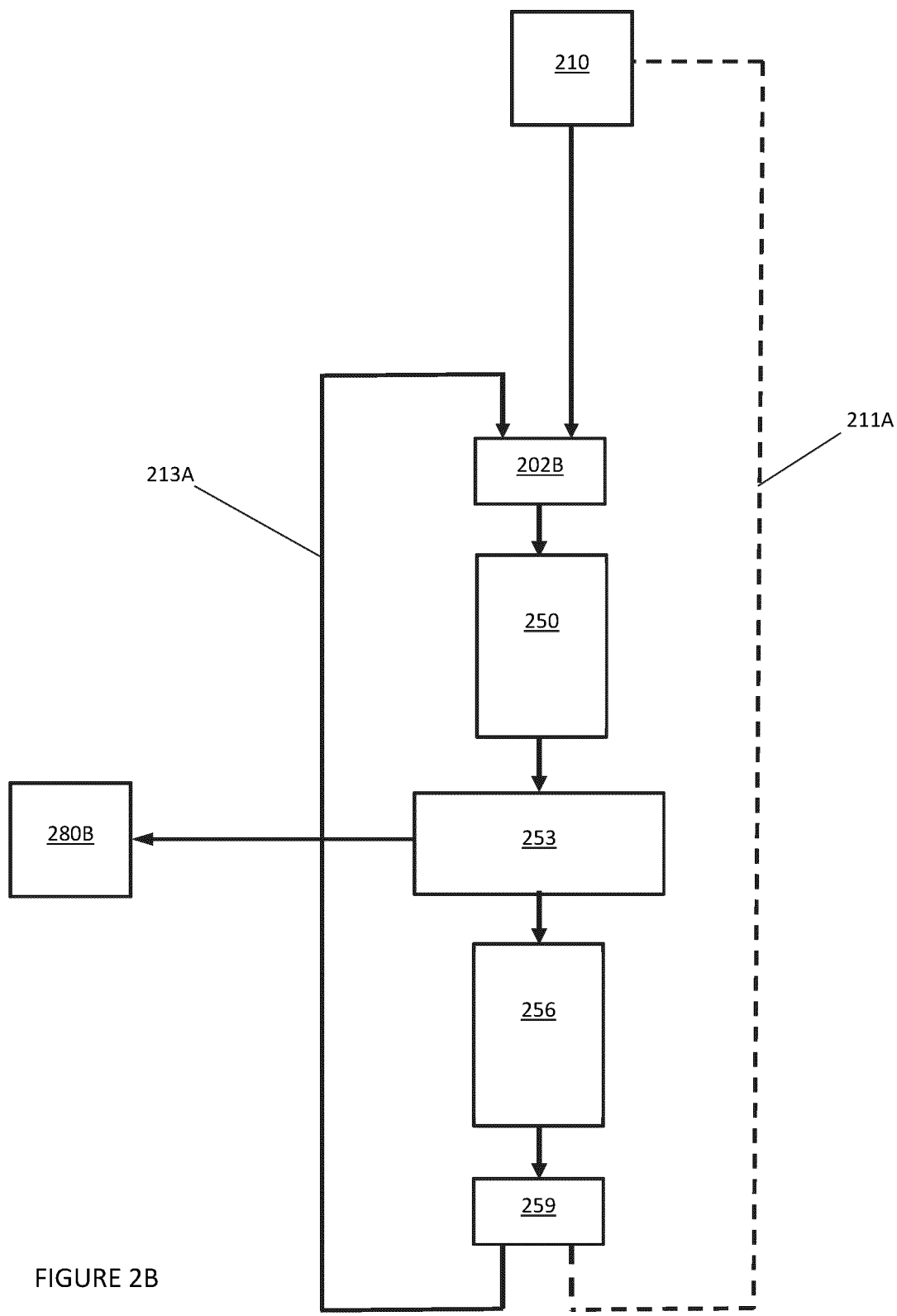
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
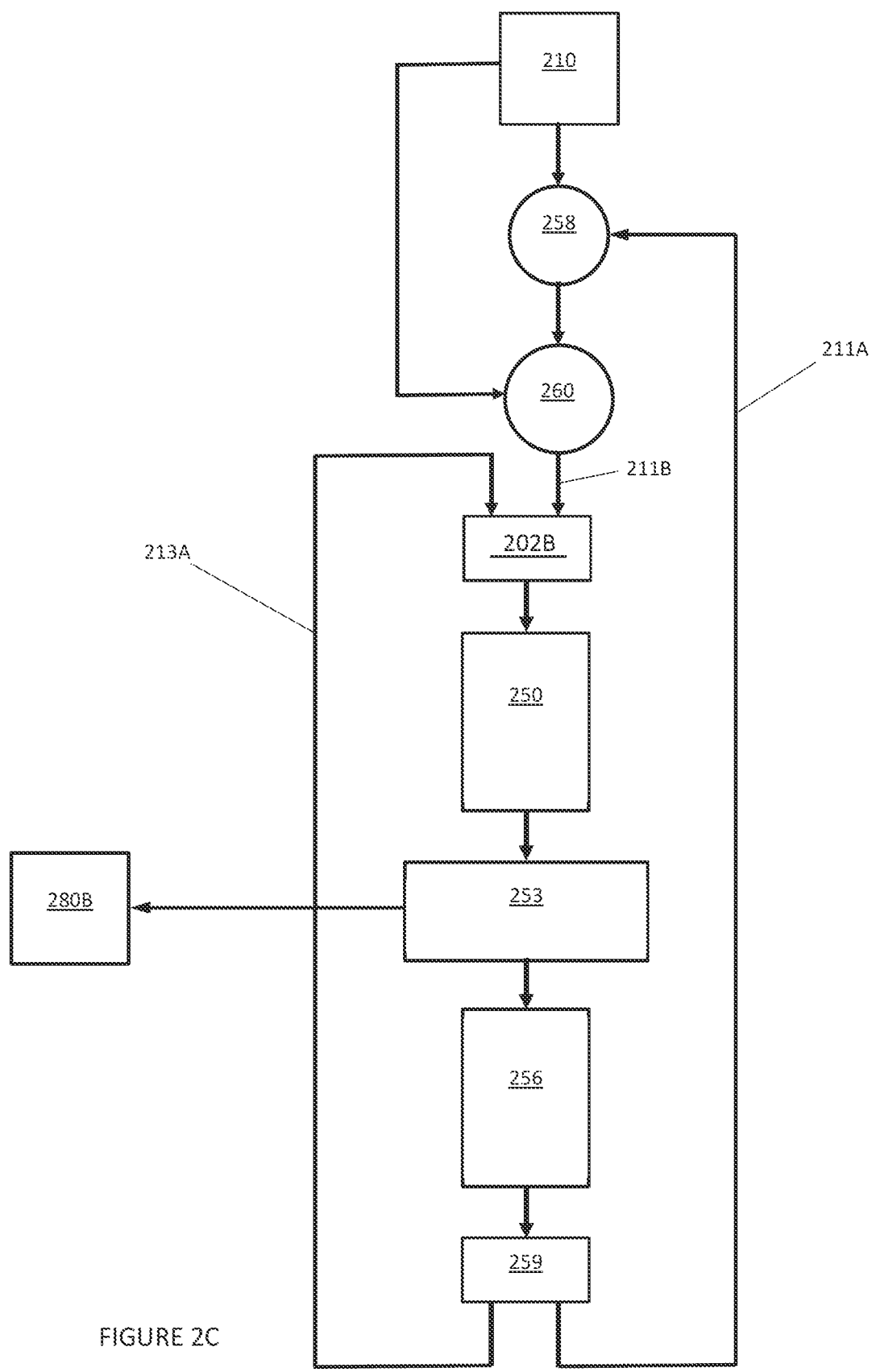
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 and 260 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\Psi_n[u,v])\}$$

$$\Psi_n[u,v] = \angle F\{\eta \cdot \exp(i\angle R_n[x,y])\}$$

$\eta = T[x,y] - \alpha(|R_n[x,y]| - T[x,y])$ where:

F' is the inverse Fourier transform;

F is the forward Fourier transform;

R[x, y] is the complex data set output by the third processing block 256;

T[x, y] is the input or target image;

∠ is the phase component;

Ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
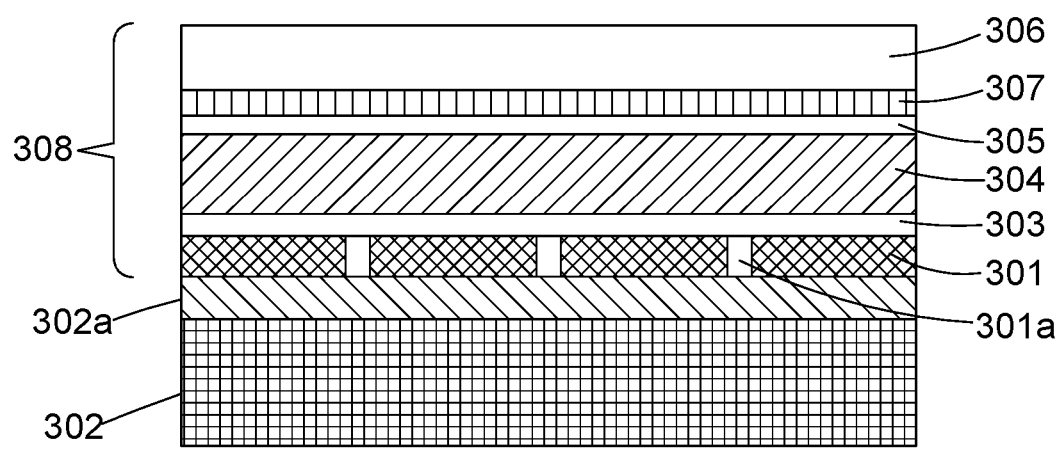
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels, such as the gap 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Waveguide Pupil/Viewing Window Expander

In holographic projection systems such as head-up displays (HUDs) it is desirable to expand the exit pupil of the system corresponding to the eye box region or viewing window. In particular, the aperture of the display device, such as a spatial light modulator, is the limiting aperture of the holographic system. That is, the aperture of the spatial light modulator—more specifically, the size of the area delimiting the array of light modulating pixels—determines the size (e.g. spatial extent) of the light ray bundle that can exit the system. This is typically small. However, the viewer needs to be able to move his or her head around and so able to see the complete image from any position within an area/volume at the eye box/viewing distance. This is known as the eye motion box (EMB) or viewing window. Thus, a pupil expander may be employed to enlarge a dimension of the EMB or viewing window. In accordance with this disclosure, it is therefore stated that exit pupil of the holographic system is expanded by a waveguide pupil expander. It may also be said that the pupil expander expands/increases the size of the received pupil.

Figure 4:
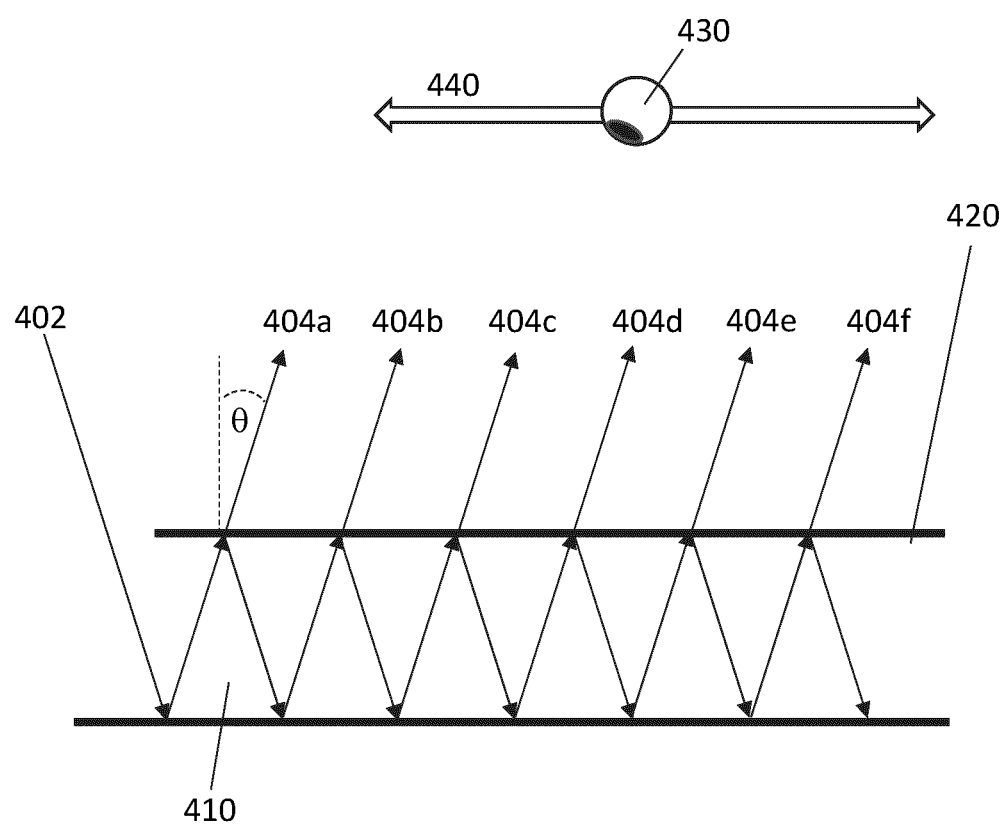
FIG. 4 shows an example pupil expander comprising a waveguide.

FIG. 4 illustrates an example pupil expander comprising a planar waveguide. The general principle of a waveguide is known in the art and not described in detail herein. A waveguide guides light within a layer between a pair of parallel reflective surfaces by internal reflection. A pupil expander is formed from a waveguide comprising a first partially reflective surface 420 (e.g. a mirror having partial reflectivity/transmissibility) and a second fully reflective surface 410 (e.g. a mirror having substantially 100% reflectivity). The first reflective surface 420 may have variable reflectivity with distance so that the transmitted rays have a desired intensity along the length of the waveguide. In particular, first reflective surface 420 may comprises a reflective coating the reflectivity of which decreases along the length of the waveguide. The layer may be glass or Perspex. The waveguide may therefore be a glass or Perspex block or slab. This may be referred to as a "bulk optic" or "slab waveguide". The first reflective surface may be a first surface of the glass block and the second reflective surface may be a second surface of the glass block, wherein the first surface is opposite and parallel to the second surface. Alternatively, the layer may be air and the first and second reflective surface may be separate components—e.g. a first and second mirrors spatially-separated to form an air gap within which light propagates by internal reflection.

Accordingly, as shown in FIG. 4, an input light beam 402 (which may comprise spatially modulated light encoded with a picture (i.e. light of a picture/image or, simply a picture) or spatially modulated light encoded with a hologram as described below) comprising input light rays enters the waveguide through an input port thereof. The waveguide is arranged to guide light received at the input port to an output port or viewing surface for output to a laminow. In the illustrated arrangement, the input port comprises a gap in the first partially reflective surface 420 near one end of the waveguide, but other positions for the input port are possible. The viewing window is an area or volume within which a viewer may view an image as described herein. The angle of incidence of the input light beam 402 is such that the light rays propagate along the length of the waveguide due to internal reflection by first partially reflective surface 420 and second fully reflective surface 410. Example rays are illustrated in FIG. 4. Due to the graded reflectivity of first reflective surface 420, a proportion of light is transmitted by first reflective surface 420 to provide a plurality of output light rays 404a-f along the length of the waveguide. Thus, first reflective surface 420 forms an output port or viewing surface. It may be said that the pupil (or viewing window) is expanded by plurality of output light rays 404a-f along the length of the waveguide, so that the viewing window is increased in size. Each light ray 404a-f corresponds to a proportion of the amplitude (intensity or brightness) of the input light beam 402. It is desirable that a graded coating provides a decrease in reflectivity (or conversely an increase in transmissivity) of the first reflective surface 420 along the length of the waveguide such that each output light ray 404a-f has substantially the same amplitude. Thus, a viewer 430 at the eye box at a viewing distance from the first reflective surface 420 is able to see the image at any position within an expanded viewing window, as illustrated by arrows 440.

The light rays 404a-f may be generally referred to as "replicas". The term "replica" may be generally understood to refer to light rays that are output by a pupil expander over an expanded exit pupil as a result of the propagation (and division of amplitude) of input light, and the term "replicate" has a corresponding meaning. In more detail, the term "replica" is merely used herein to reflect that light is divided as it propagates within the waveguide and directed for output along different optical paths. In the case of spatially modulated light encoded with a hologram, the spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not image—i.e., light that is spatially modulated with a hologram of an image, not the image itself. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length such that the complex light field has evolved differently along each path. That is, two complex light fields are still considered "replicas" in accordance with this disclosure even if they are associated with different propagation distances—providing they have arisen from the same replication event or series of replication events.

The waveguide shown in FIG. 4 expands the viewing window in one dimension—corresponding to the lengthwise direction along which the light beam propagates within the waveguide—as shown by arrows 440. As the skilled person will appreciate, it is possible to expand the viewing window in two dimensions, when required, by using two orthogonal waveguides.

Example implementations of the present disclosure comprise holographic display devices and methods that use a waveguide as a pupil expander as described above.

FIRST EMBODIMENTS

Figure 5:
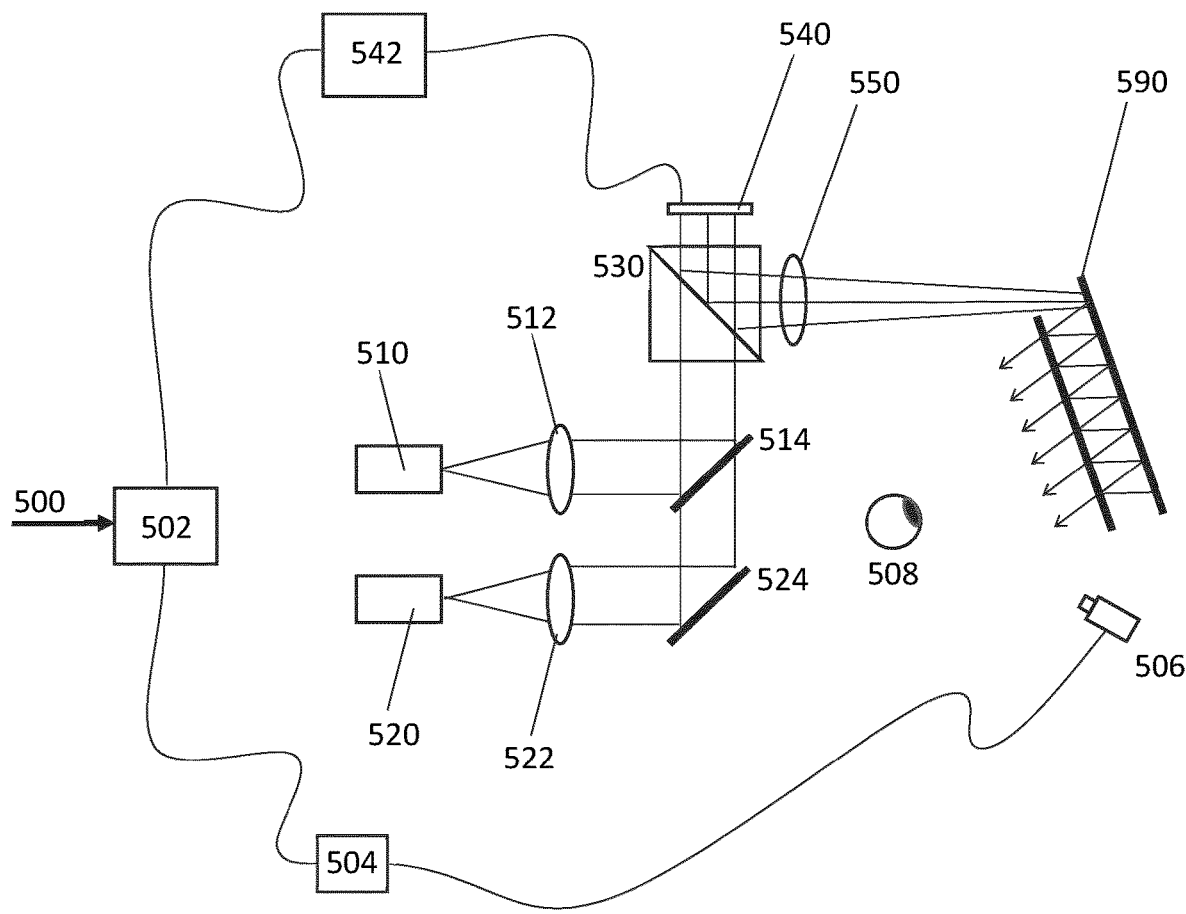
FIG. 5 shows a holographic display device comprising a pupil expander in accordance with embodiments.

FIG. 5 shows a holographic display system comprising waveguide pupil expander in accordance with first example embodiments of the present disclosure.

Holographic system comprises a display device arranged to form an image. In the illustrated arrangements, display device is arranged to form two single colour images. Referring to FIG. 5, a first single colour/display channel (e.g. red colour channel) comprises a first light source 510, a first collimating lens 512 and a first dichroic mirror 514 arranged to illuminate spatial light modulator (SLM) 540 with light of the first wavelength. A second single colour/display channel (e.g. green colour channel), comprises a second light source 520, a second collimating lens 522 and a second mirror 524 arranged to illuminate the SLM 940 with light of the second wavelength.

The holographic system further comprises a holographic controller 502 arranged to control the system as described herein. A first single colour computer-generated hologram of a first single colour image (e.g. red image) is calculated by holographic controller 502 and encoded on SLM 540, for example by a display driver 542. SLM 540 displays the first hologram and is illuminated by light of the first colour from the first colour/display channel so as to output first spatially modulated light of the first colour encoded with first hologram. Similarly, a second single colour computer-generated hologram of a second single colour image (e.g. green image) is calculated by holographic controller 502 and encoded on SLM 540. SLM 540 displays the second hologram and is illuminated by light of the second colour from the second colour/display channel so as to output second spatially modulated light of the second colour encoded with the second hologram.

The holographic system further comprises a beam splitter cube 530, arranged to separate input light to and output light from SLM 540. In the embodiment of FIG. 5, the holographic display system is arranged in a direct view configuration. In the illustrated arrangement, a lens 550 is positioned in the optical path of the spatially modulated light output by SLM 540. Lens 550 is optional. A viewer 508 may directly-view the spatially modulated light in accordance with the hologram from SLM 540. In some embodiments, as described above, the lens of the viewer's eye forms a holographic reconstruction on the retina of the eye. Thus, it may be said that the display device forms image on an image plane corresponding to the retina of the eye. In these embodiments, it may be said that the viewer receives spatially modulated light encoded with the hologram. In other words, the viewer receives light encoded with the hologram of the image, rather than the image itself. Waveguide 590 comprises an optically transparent medium separated by first and second reflective surfaces as described herein. Thus, holographic display device has an "direct view" configuration—that is the viewer looks directly at the display device/SLM.

SECOND EMBODIMENTS

Figure 6:
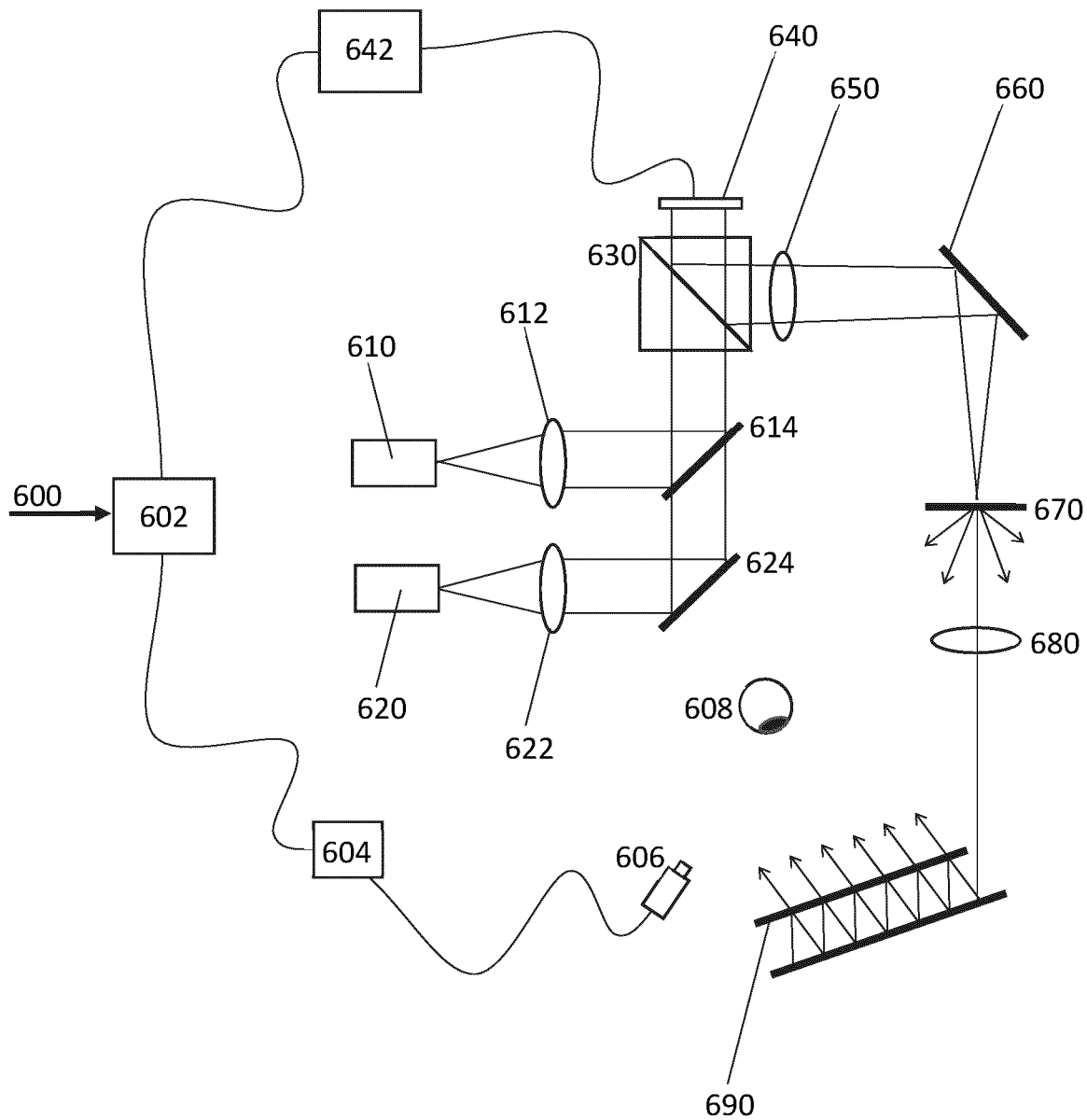
FIG. 6 shows a holographic display device comprising a pupil expander in accordance with further embodiments.

FIG. 6 shows a holographic display system comprising a waveguide forming a waveguide pupil expander in accordance with second example embodiments of the present disclosure.

The holographic system illustrated in FIG. 6 is similar to the holographic system of FIG. 5, and likewise is arranged to form two single colour images. Thus, a first single colour channel (also called "first display channel") comprises a first light source 610, a first collimating lens 612 and a first dichroic mirror 614. First dichroic mirror 614 is arranged to reflect light of a first wavelength along a common optical path so as to illuminate a spatial light modulator (SLM) 640. The first wavelength of light corresponds to the first display channel of a first colour (e.g. red). A second single colour channel (also called "second display channel") comprises a second light source 620, a second collimating lens 622 and a second mirror 624. Second mirror 624 is arranged to reflect light of a second wavelength along the common optical path so as to illuminate the SLM 640. The second wavelength of light corresponds to the second single colour channel of a second colour (e.g. green). In the illustrated embodiment, SLM 640 comprises a single array of light modulating pixels (e.g. LCOS) that is illuminated by light of both the first and second wavelengths. In other embodiments, SLM 640 may comprise separate arrays of light modulating pixels that are illuminated by light of the respective first and second wavelengths.

The holographic system further comprises a holographic controller 602 arranged to control the system as described herein. A first single colour computer-generated hologram is calculated by holographic controller 602 and encoded on SLM 640, for example by a display driver 642. The SLM 640 displays the first hologram and is illuminated by light of the first colour from the first colour/display channel so as to output spatially modulated light and form a first holographic reconstruction on the light receiving surface 670 which is positioned at the replay plane. First spatially modulated light of the first colour is output by SLM 640 to form a first single colour image (e.g. red image) on a light receiving surface 670, such as a screen or diffuser. Similarly, a second single colour computer-generated hologram is encoded on SLM 640 by holographic controller 602. The SLM 640 displays the second hologram and is illuminated by light of the second colour from the second colour/display channel so as to output spatially modulated light and form a second holographic reconstruction on the light receiving surface at the replay plane. Second spatially modulated light of the second colour is output by SLM 640 to form a second single colour image (e.g. green image) on the light receiving surface 670.

In the illustrated arrangement, a beam splitter cube 630 is arranged to separate input light to SLM 640 and spatially modulated light output by SLM 640. A Fourier lens 650 and mirror 660 are provided in the optical path of the output spatially modulated light to light receiving surface 670. It may be said that a first/second image is formed on the light receiving surface 670. The first/second images are first/second holographic reconstructions of the respective first/second holograms. Thus, a composite colour picture may be formed on light receiving surface 670 combining the first and second single colour images. A projection lens 680 is arranged to project the first and second images formed on the light receiving surface 672 to an input port of a pupil expander in the form of a waveguide 690. A viewer 608 may view a magnified image of the pictures from the expanded eye box—the "viewing window"—formed by waveguide 690 owing to optical power of projection lens 680. Waveguide 690 comprises an optically transparent medium separated by first and second reflective surfaces as described above with reference to FIG. 4. Thus, holographic display device has an "indirect view" configuration—that is the viewer does not directly view the display device/SLM, but rather views the images formed on light receiving surface 670.

The holographic systems of FIGS. 5 and 6 further comprises a viewer-tracking system comprising an eye tracking camera (506, 606) and an eye tracking controller (504, 604). As known in the art, eye tracking camera is arranged to capture images of the eye(s) of the viewer for tracking the eye position, and thus the viewing position within the viewing window. Eye tracking controller (504, 604) provides feedback to holographic controller (502, 602) indicating the current viewing position.

As well as the feedback input from viewer-tracking system, holographic controller 602 may receive other external and internal inputs 600 for use in generating the computer-generated holograms as known in the art. Such inputs may determine the image content for display by the holographic display device.

In the holographic system illustrated in accordance with the embodiments of each of FIGS. 5 and 6, the display device comprises a first colour (e.g. red) display channel arranged to display a first single colour hologram and a second colour (e.g. green) display channel arranged to display a second single colour hologram, by way of example only. In other example implementations, three or more display channels may be provided configured to display respective single colour holograms. For example, a full-colour composite image/picture may be formed by displaying respective red, green and blue single colour holograms. In other example implementation, only a single display channel is provided.

Waveguide Pupil Expander with Improved Integrity

As described above, a holographic system comprising a display device, such as a spatial light modulator, includes one or more pupil expanders to expand the viewing window in one or more dimensions. A pupil expander is typically implemented as a bulk optic waveguide comprising planar parallel (major) reflective surfaces as described above with reference to FIG. 4. However, in practice, this type of waveguide pupil expander is a relatively large component (e.g. largest two dimensions/dimensions of the major surfaces are each a few hundred millimetres, for instance, between 100 millimetres and 300 millimetres, such as 150 millimetres) and is formed from an optically transparent solid material such as glass. The waveguide pupil expander is therefore fragile due to the glass material and dimensions thereof. Thus, when the holographic system is used in certain applications, such as in a head-up display within a vehicle, the waveguide pupil expander is at risk of breakage in the event of an impact, such as a vehicle collision. In particular, an automotive head-up display is installed within a cavity of a vehicle that is beneath the bonnet or hood that is designed to crumple upon collision and is also close to the driver. In addition, the bulk optic waveguide(s) is a relatively large optical component (e.g. in comparison to a lens), that is arranged with, and spatially separated from, components of the display device within a typically thin-walled housing. This means that the bulk optic waveguide(s) is not securely fastened to the frame or chassis of the vehicle and may move in the event of impact to the vehicle. This leads to a high likelihood of breakage of the glass of the bulk optic waveguide(s) and of the resulting glass fragments being expelled from the vehicle towards the driver, either as a direct result of a collision impact, or indirectly by the crumpling of the bonnet, the release of airbags and the like.

The breakage of the glass within the waveguide may compromise the structural integrity of the pupil expander. For example, such breakage glass may undesirably lead to the generation of uncontained large glass fragments that have the potential to cause injury. In addition, even if glass of the waveguide shatters, without expelling fragments, the shattered glass may compromise the functional integrity of the pupil expander. For example, a fracture within the glass may change the direction of propagation of light through the waveguide, leading to undesirable reflection and scattering. This may not only degrade image quality, but may also lead to the scattering of laser light towards a viewer, which may be dangerous. Again, this is of particular concern for an automotive head-up display with a display device having a laser light source, due to the fragile nature and size of the waveguide (e.g. 100 millimetres to 300 millimetres in one or two dimensions), which may fracture upon even a relatively minor collision.

Accordingly, embodiments of the present disclosure provide improved integrity of a bulk optic waveguide comprising a fragile optically transparent (solid) material such as glass.

Layered Glass Structures

The structure of the waveguide pupil expander in accordance with the first aspect of the present disclosure may take various different layered forms that include a fragile optically transparent (solid) material such as glass, herein referred to as a "layered glass structure". Examples are described below with reference to FIGS. 7 to 10.

Figure 7:
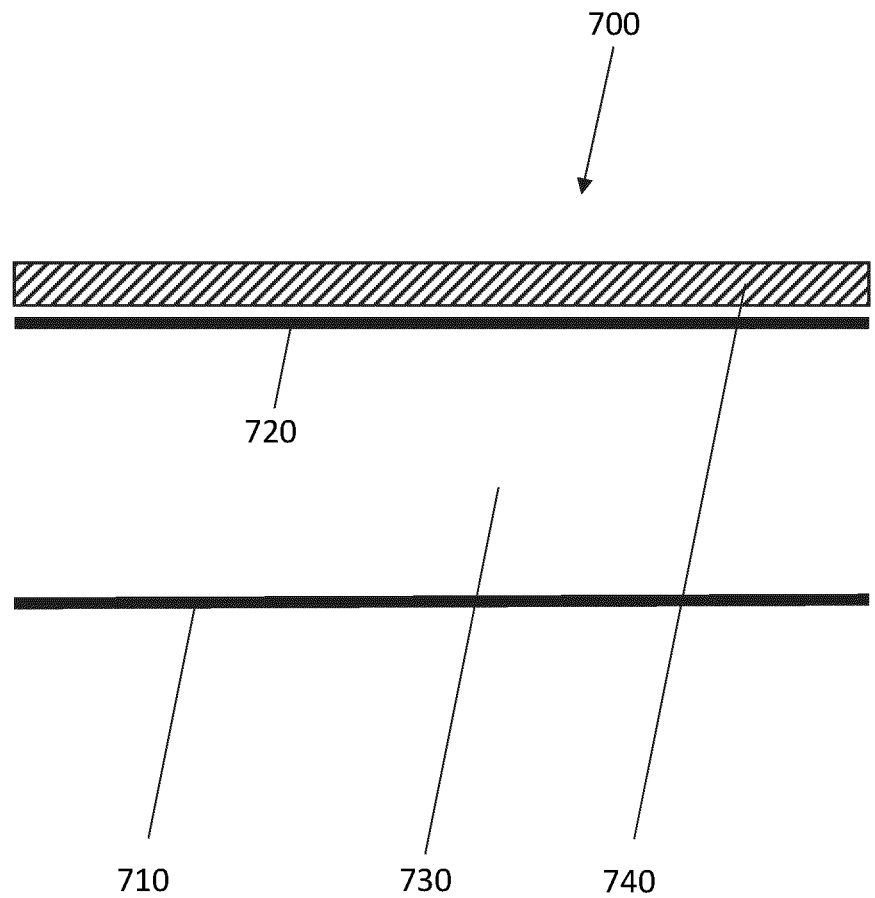
FIG. 7 shows a layered structure of a pupil expander in accordance with embodiments.

FIG. 7 shows a schematic cross-section of a waveguide pupil expander 700 comprising a layered glass structure of a first example. Waveguide 700 comprises first and second reflective major surfaces 720, 710, generally arranged as described above with reference to FIG. 4. In particular, a waveguide comprises a first substantially planar partially reflective surface 720 (e.g. having partial reflectivity/transmissibility) and a second substantially planar fully reflective surface 710 (e.g. having substantially 100% reflectivity), arranged parallel to, and spatially separated from, first partially reflective surface 720. In accordance with the first example, the waveguide 700 comprises a layered glass structure comprising a glass layer 730 laminated with or to a polymer-based layer 740. In one example, polymer-based layer 740 comprises a plurality of parallel polymer-based lines or slats, for example formed as a polymer-based louvre or mesh. In another example, polymer-based layer may comprise a polymer-based polariser, such as a circular polariser. In still a further example, the polymer-based layer comprises a polymer-based turning film arranged to change or "turn" the angle of propagation of a (typically collimated) beam, as well known in the art. In the illustrated example, the polymer-based layer is laminated with or to the second partially reflective/partially transmissive surface 720.

Laminating a polymer-based layer 740 with or to the glass (e.g., float glass) layer 730 serves two functions. First, the polymer helps maintain the (structural) integrity of waveguide 700 in the event of shattering of glass layer 730. Secondly, the louvre/polariser/turning film arrangement of the polymer-based layer 740 functions to mitigate unwanted glare. In particular, as described in UK patent application No. GB2016616.1, which is incorporated herein by reference, a circular polariser may be arranged adjacent a partially reflective surface of a waveguide to reduce glare at the viewing surface of the waveguide pupil expander and/or at the viewing window in a holographic system, for example when used in a head-up display (HUD). Accordingly, in embodiments in which the polymer-based layer 740 comprises a polymer-based circular polariser, it is possible to reduce glare and at the same time maintain integrity of the waveguide 700, as described herein. Similarly, in embodiments in which the polymer-based layer 740 comprises a plurality of parallel polymer-based lines or slats, the separation between the parallel lines or slats may be selected according to application requirements. In particular, the spacing between the parallel lines or slats may be chosen to optimise the (structural) integrity of the waveguide upon breakage based on the materials and dimensions thereof. At the same time, the spacing between the parallel lines or slats may be chosen to block light at angles corresponding to light reflected from the viewing surface of the waveguide, formed by the second reflective surface of the pair of parallel reflective surfaces thereof, whilst transmitting all angles of spatially modulated light originating from the display device. Thus, it is possible to select the periodicity of the polymer-based louvre or mesh in order to serve the dual purpose of reducing glare (e.g. from sunlight) at the same time as maintaining integrity of the waveguide, as described herein. This is particularly valuable in automotive head-up display applications, in which the viewing surface of the waveguide pupil expander direct faces the vehicle windscreen or windshield of a vehicle. In particular, the windscreen or windshield receives the projected light from the viewing surface (which forms the output port of the waveguide) and acts as an optical combiner for a viewer to view both the image and the real word at the same time. Thus, the position of the waveguide is such that direct sunlight may be incident on the second reflective surface forming the output port, and so reflected towards the viewer causing glare, which may be a safety hazard for a driver of the vehicle.

Finally, in embodiments in which the polymer-based layer 740 comprises a light turning film, the turning angle of the film may be selected to control the direction of the output light field from the waveguide, for example towards a particular target area of the viewing window, as described in UK patent application GB2209439.5. Thus, in these embodiments, the polymer-based layer provides an improved viewing experience as well as maintaining waveguide integrity.

Figure 8:
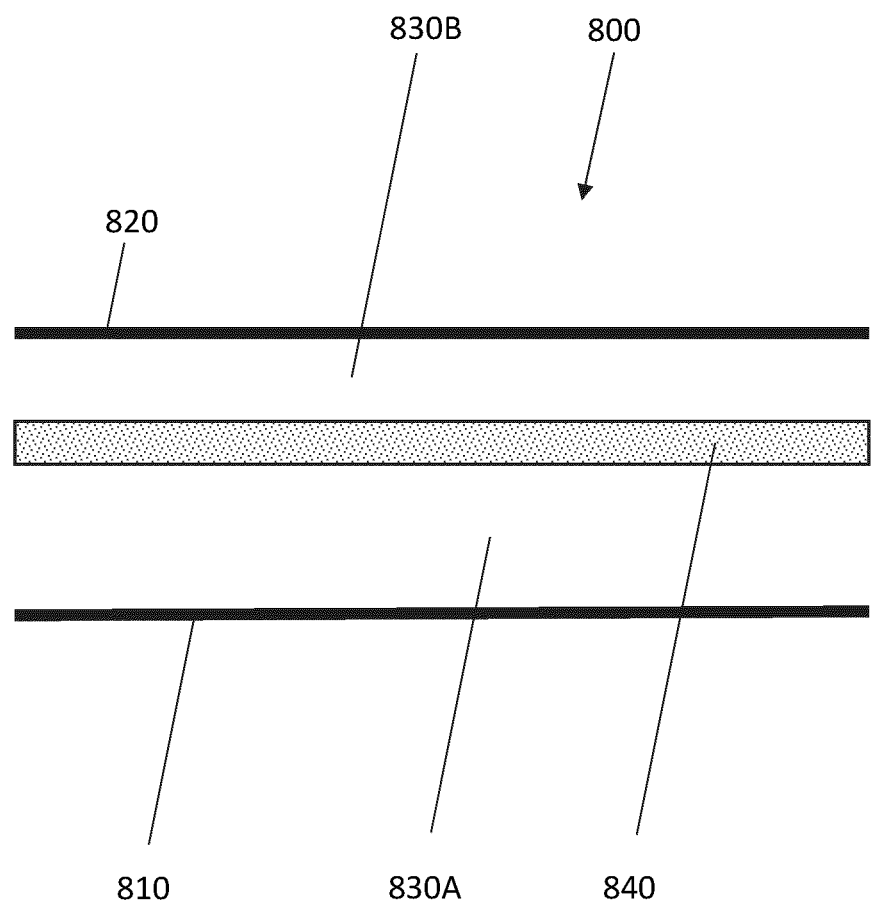
FIG. 8 shows a layered structure of a pupil expander in accordance with further embodiments.

FIG. 8 shows a schematic cross-section of a waveguide pupil expander 800 comprising a layered glass structure of a second example. Similar to the first example, waveguide 800 comprises first and second reflective major surfaces, 820, 810 arranged in parallel with an optically transparent material therebetween for propagating light. In accordance with the second example, the optically transparent material comprises a layered glass structure comprising one or more glass layers 830 and a resin layer 840. In the illustrated arrangement, the layered glass structure comprises a resin layer 840 sandwiched between first and second glass layers 830A, 830B. The first and second glass layers 830A, 830B may have low birefringence and the resin layer 840 may comprise a refractive index-matched resin material.

The resin layer 840 may comprises a polyvinyl butyral (PVB) resin interlayer. PVB is particularly suitable as it can be readily refractive index matched to the glass material and flows relatively freely. In addition, the layer structure may be formed in a press.

Laminating a resin layer 840 to or with the glass layer(s) 830A, 830B helps maintain the structural integrity of waveguide 800 in the event of shattering of glass layer 830A, 830B. In particular, the resin is chosen to provide the necessary parallelism (between the outer surfaces) in the glass layer(s) 830A, 830B. In addition, refractive index matching of the resin layer may assist in maintaining the functional integrity of the waveguide 800, so that any fracture of the glass does not adversely affect the propagation of light therethrough.

As the skilled person will appreciate, the second example of FIG. 8 adds one or more interlayers to glass within the optically transparent material between the reflective surfaces of the waveguide. However, other forms of layered glass structure are possible.

Figure 9:
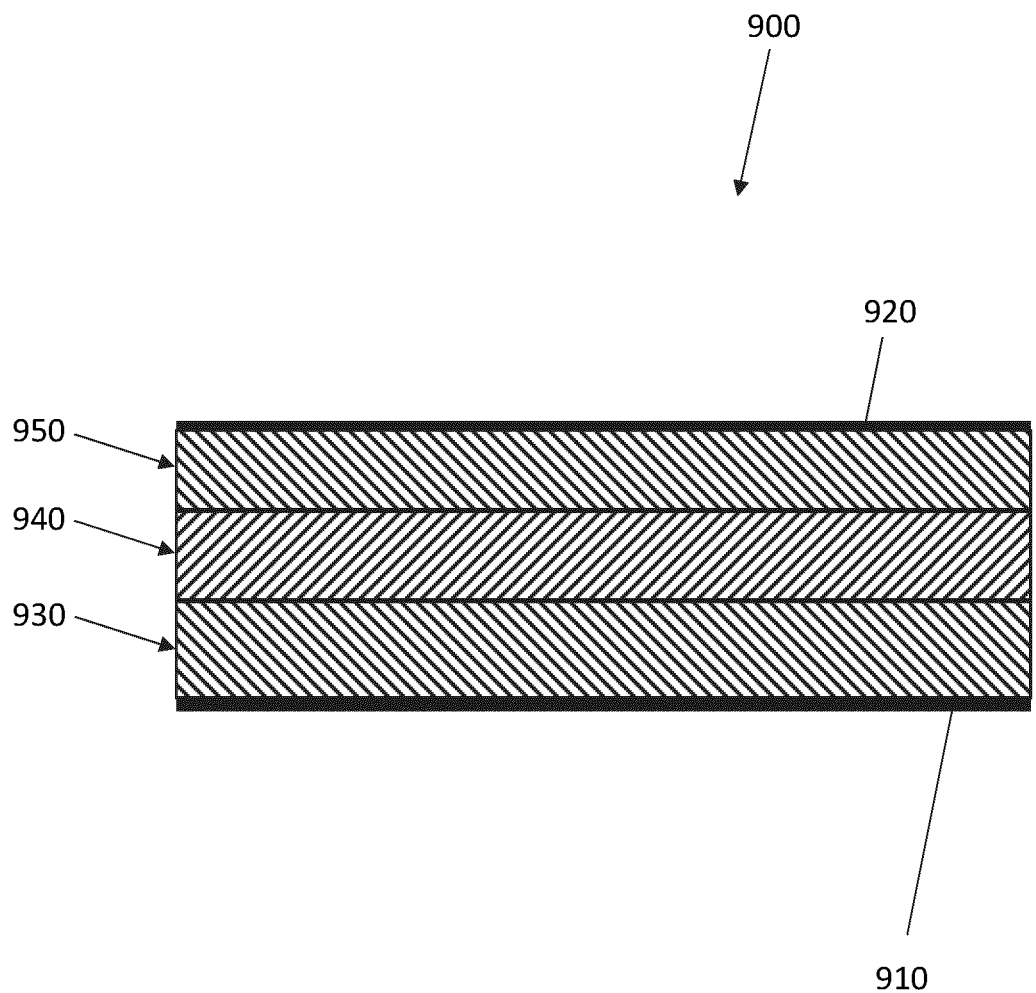
FIG. 9 shows a layered structure of a pupil expander in accordance with still further embodiments.

FIG. 9 shows a cross section of a waveguide pupil expander 900 comprising a layered glass structure of a third example. Similar to the first and second examples, waveguide 900 comprises first and second reflective major surfaces, 920, 910 arranged in parallel with an optically transparent material therebetween for propagating light. In accordance with the third example, the optically transparent material between the first and second reflective surfaces 920, 910 comprises a layered glass structure comprising tempered glass. In particular, the optically transparent material comprises glass that is tempered to form an inner glass region or layer 940 under tensile strain arranged between a pair of outer glass regions or layers 930, 950 under compressive strain.

Tempering the glass forming the optically transparent material functions to strengthen the glass, so as to prevent or mitigate substantial breakage upon impact and reduce shattering. As the skilled person will appreciate, the use of tempered glass in accordance with the third example may be implemented in combination with one or more of the other examples.

Figure 10:
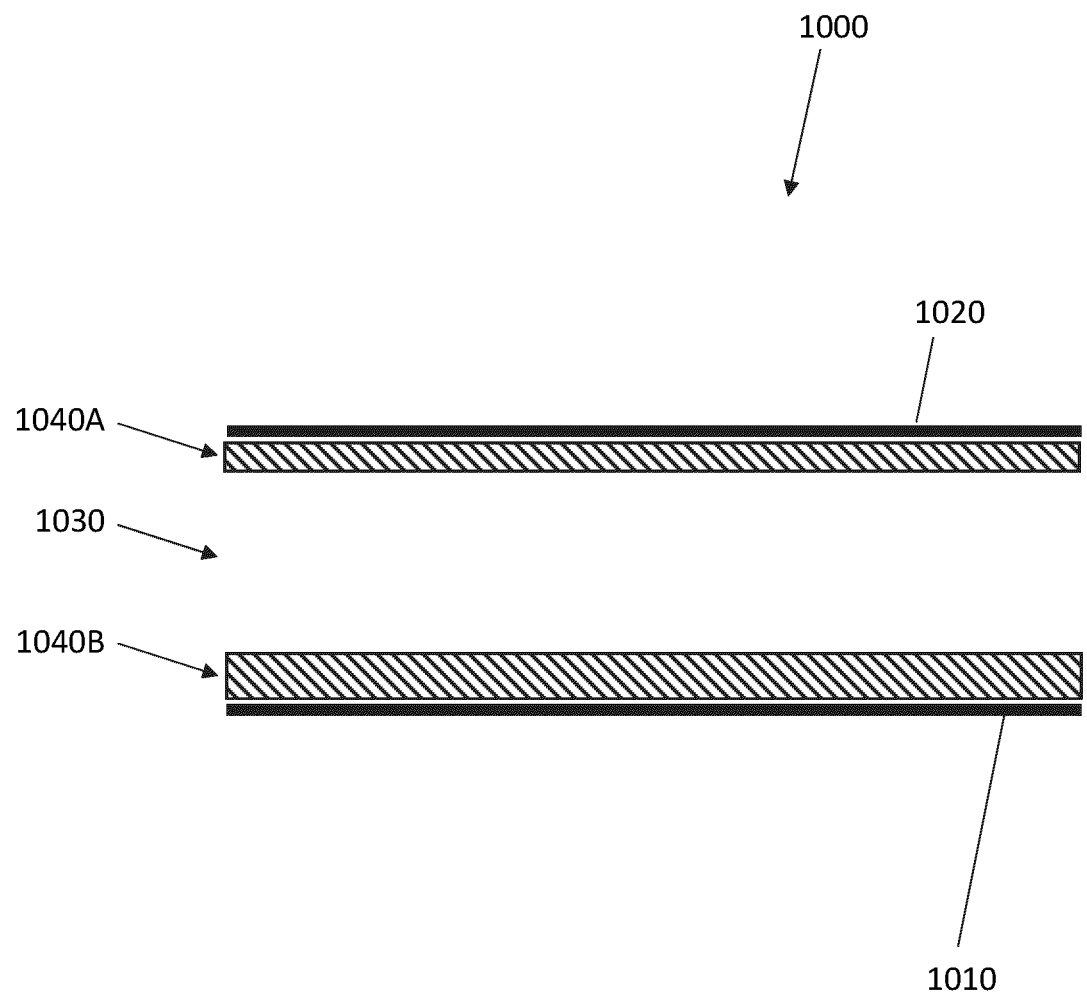
FIG. 10 shows a layered structure of a pupil expander in accordance with yet further embodiments.

FIG. 10 shows a cross-section of a waveguide pupil expander 1000 comprising a layered glass structure of a fourth example. Similar to the previous examples, waveguide 1000 comprises first and second reflective major surfaces, 1020, 1010 arranged in parallel with an optically transparent material therebetween for propagating light. However, unlike the previous examples, the optically transparent material (primarily) comprises an air gap 1030. In this example, first and second reflective surfaces 1020, 1010, comprise mirrors, each in the form of a relatively thin, optically transparent substrate (e.g., glass) with one or more reflective coatings thereon. In this example, one or more additional layers 1040A, 1040B of another material, such as a polymer-based layer, a resin layer and/or a tempered glass layer, are provided between air gap 1030 and one or both of first and second reflective surfaces 1020, 1010.

It is found that the use of a bulk optic waveguide as described herein may effectively function as a pupil expander. In accordance with the above examples of the first aspect, which may be used alone or in any suitable combination, the present disclosure proposes a layered glass structure of the waveguide pupil expander that is adapted, configured or arranged to maintain the integrity of the waveguide in the event of breakage of glass therein. This leads to improved safety as well as maintaining functionality in certain scenarios dependent up the amount of damage to the glass.

Implementations in a Holographic System

As the skilled person will appreciate, the layers of the layered glass structure in accordance with the examples as described above with reference to FIGS. 8 to 10 may alter the birefringence of the optical path of light that is guided through the layered structure of the waveguide between an input port and the exit pupil/viewing window compared to a conventional glass or air cavity. Accordingly, the holographic system in accordance with the first aspect of the present disclosure (i.e. in which the waveguide pupil expander is implemented) needs to be adapted to account for any such birefringence and its effect at different positions along the length of the waveguide. Thus, for example, a holographic system as shown in FIG. 5 or 6 may use the eye tracking system to determine the viewer's eye position, and to adjust the diffractive pattern displayed on the SLM to compensate for wavefront errors due to propagation of light (e.g., through different propagation distances/more layers of the layered structure).

Other Safety Features

Other safety features may be used in a holographic system in accordance with a second aspect of the present disclosure.

For example, the aforementioned technique for adapting a holographic system to the particular birefringence associated with a different transparent optical material within the waveguide cavity may also be used in conjunction with a transparent plastic waveguide. A transparent plastic waveguide may be injection moulded for ease of manufacture. The plastic material may be chosen so that the risk of shattering or other damage upon impact is low. For example, the transparent optical material may comprise a transparent polycarbonate or silicon grade material suitable for TIR optics (e.g. soft polymer).

Other example safety features may include using an expanding foam, optionally with a black filler, that is released upon detection of a collision, in the same way as a safety airbag. The foam may prevent release of shattered parts and further assist in maintaining parallelism and structural integrity of the waveguide. In addition, the use of a black filler may absorb stray/scattered light to thereby prevent it from reaching the viewer's eyes. In accordance with further examples, the waveguide (and optionally other fragile optical components) may be immersed in a (transparent) fluid, a high refractive index (transparent) liquid may be used between the waveguide and a cover glass (e.g. curved cover) or an optically clear adhesive (OCA) may be pumped around the waveguide at the end of fabrication to form a protective coating. In each of these further examples, the glass of the waveguide may be protected and/or supress shocks from a collision impact, so as to prevent release of shattered parts and further assist in maintaining parallelism and structural integrity of the waveguide.

A holographic system may further comprise one or more light detectors arranged for monitoring for, and detecting the position of, scattered light (e.g. laser light) due to glass breakage. Such scattered light may represent a safety hazard to a viewer's eyes. The light detectors may be associated with the waveguide pupil expander to detect scattered light directly therefrom, or may be arranged to detect other scattered light from other reflective surfaces, such as the windscreen of a vehicle, due to the shattered glass. Such a light detecting system may provide a light detection signal to the holographic controller as part of a closed-loop feedback system to maintain safety (e.g. by switching off the laser light source).

The waveguide pupil expander may be adapted or configured so that an external surface can be mounted to a relatively large and stable object, for example a large metal component within a vehicle. In particular, the external surface corresponding to the second fully reflective layer may be mounted to a stable component, which can absorb the impact of a collision and reduce the risk of shattering. Mounting the waveguide to a component of metal has the additional advantage of improving thermal stability. Furthermore, the fully reflective layer may be integrated within such a planar metal component on which it is mounted, for example, by providing a fully reflective coating on the planar surface of the metal component, which thus functions as part of the waveguide. Other optical components (of the holographic system) may be attached (to the metal component) using foam or a low refractive index material.

The eye tracking system of a holographic system may also be utilised to detect a collision and/or dangerous effects of a collision, and provide feedback to the holographic controller to take safety measures. For example, the eye tracking system described with reference to FIGS. 5 and 6 may use infrared (IR) light source to provide pulsed illumination of the viewer's (e.g., driver's) face. A camera that can detect both IR and visible light may be used not only for eye tracking but also to detect visible light. In periods between IR pulses, visible light scattered by the waveguide or due to broken glass or otherwise directed towards the face of the viewer as a result of a collision may be detected by the camera. In periods of pulsed IR, the camera may be used to detect laser (IR) light that, as a result of the collision, is directed towards the face of the driver and presents a safety hazard. In the event of detecting such safety hazards, the eye tracking system can provide a feedback signal to the holographic controller to turn of the relevant lasers and so on.

As the skilled person will appreciate, it is possible to combine the first and second aspect of the present disclosure by implementing the above other safety features in a holographic system comprising a waveguide pupil expander having a layered glass structure, as described above.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In embodiments, only the primary replay field is utilised and system comprises physical blocks, such as baffles, arranged to restrict the propagation of the higher order replay fields through the system.

In the above described embodiments, the holographic reconstruction is a composite colour image. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A waveguide pupil expander comprising:
   first and second substantially planar reflective surfaces arranged in parallel having an optically transparent material therebetween, and
   an input port for receiving input light;
   wherein the first reflective surface is fully reflective and the second reflective surface is partially reflective such that input light is guided from the input port to an output port at the second partially reflective surface by a series of internal reflections;
   wherein the waveguide is formed by a layered glass structure arranged to maintain the integrity of the waveguide in the event of breakage of glass; and
   wherein the layered glass structure comprises a polymer-based layer comprising a polymer-based turning film arranged to change an angle of light propagating therethrough; a polymer-based louvre, or a polymer-based polariser.

2. The waveguide pupil expander as claimed in claim 1 wherein the layered glass structure comprises a glass layer and an optically transparent non-glass layer.

3. The waveguide pupil expander as claimed in claim 1 wherein the layered glass structure comprises a glass layer laminated with the polymer-based layer.

4. The waveguide pupil expander as claimed in claim 1 wherein the layered glass structure comprises a glass layer and a resin layer.

5. The waveguide pupil expander as claimed in claim 4 wherein the layered glass structure forms the optically transparent material, wherein the layered glass structure has low-birefringence and/or the resin is a resin material that is refractive index-matched to the glass.

6. The waveguide pupil expander as claimed in claim 4 wherein the layered glass structure comprises a resin interlayer between internal major surfaces of first and second glass layers.

7. The waveguide pupil expander as claimed in claim 6 comprising a fully reflective coating on the external major surface of the first glass layer and a partially reflective coating on the external major surface of the second glass layer surface.

8. The waveguide pupil expander as claimed in claim 4 wherein the resin material is arranged to maintain parallelism between the external major surfaces of the first and second glass layers.

9. The waveguide pupil expander as claimed in claim 8 wherein the resin material comprises polyvinyl butyral.

10. The waveguide pupil expander as claimed in claim 1 wherein the layered glass structure comprises two or more layers of tempered glass.

11. The waveguide pupil expander as claimed in claim 10 wherein the layered glass structure forms the optically transparent material.

12. The waveguide pupil expander as claimed in claim 10 wherein the layered glass structure comprises a first layer of glass under compressive strain and a second layer of glass under tensile strain.

13. The waveguide pupil expander as claimed in claim 12 wherein the layered glass structure further comprises a third layer of glass under compressive or tensile strain.

14. A system comprising:
 a display device comprising a spatial light modulator arranged to output spatially modulated light to form an image, and
 the waveguide pupil expander as claimed in claim 1 configured to receive spatially modulated light from the display device at an input port thereof and to expand the viewing window of the system.

15. The system as claimed in claim 14 wherein the display device further comprises a controller configured to control the spatially modulated light output by the display device.

16. The system as claimed in claim 15 wherein the controller is configured to control a light source of the display device in response to a signal indicating detection of the breakage of glass.

17. The system as claimed in claim 14 further comprising a viewer tracking system arranged to monitor a viewer's face to detect stray light incident thereon.

18. The system as claimed in claim 17 wherein the viewer tracking system comprises a light detector directed at the viewer's face to detect stray visible light, such as visible laser light, on the viewer's face.

19. The system as claimed in claim 14 comprising a holographic system, wherein:
 the display device comprises a spatial light modulator arranged to display a diffractive pattern of the image and to output spatially modulated light in accordance with the diffractive pattern to form a holographic reconstruction corresponding to the image.

* * * * *